United States Patent
Yamanaka et al.

(10) Patent No.: US 12,451,704 B2
(45) Date of Patent: Oct. 21, 2025

(54) ELECTRICITY STORAGE DEVICE CONTROL CIRCUIT AND BACKUP POWER SUPPLY SYSTEM INCLUDING SAME

(71) Applicant: Panasonic Intellectual Property Management Co., Ltd., Osaka (JP)

(72) Inventors: Shohei Yamanaka, Osaka (JP); Yasuhiro Iijima, Osaka (JP); Yohsuke Mitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 9 days.

(21) Appl. No.: 18/257,459

(22) PCT Filed: Dec. 20, 2021

(86) PCT No.: PCT/JP2021/047003
§ 371 (c)(1),
(2) Date: Jun. 14, 2023

(87) PCT Pub. No.: WO2022/145270
PCT Pub. Date: Jul. 7, 2022

(65) Prior Publication Data
US 2024/0030722 A1    Jan. 25, 2024

(30) Foreign Application Priority Data
Dec. 28, 2020   (JP) .................... 2020-218538

(51) Int. Cl.
*H02J 7/00*    (2006.01)
*H02J 7/34*    (2006.01)

(52) U.S. Cl.
CPC .......... *H02J 7/0016* (2013.01); *H02J 7/0047* (2013.01); *H02J 7/007182* (2020.01); *H02J 7/345* (2013.01)

(58) Field of Classification Search
CPC .. H02J 7/0016; H02J 7/0047; H02J 7/007182; H02J 7/345; H02J 7/02; H02J 7/34
See application file for complete search history.

(56) References Cited

U.S. PATENT DOCUMENTS

| | | | |
|---|---|---|---|
| 2011/0089909 A1* | 4/2011 | Higashi ................. | H02J 7/0016 320/166 |
| 2014/0145678 A1* | 5/2014 | Hwang ..................... | H02J 3/32 320/118 |

(Continued)

FOREIGN PATENT DOCUMENTS

| | | |
|---|---|---|
| JP | 2005-253289 A | 9/2005 |
| JP | 2018-196203 A | 12/2018 |

(Continued)

OTHER PUBLICATIONS

International Search Report dated Mar. 15, 2022 issued in International Patent Application No. PCT/JP2021/047003, with English translation.

*Primary Examiner* — Lincoln D Donovan
*Assistant Examiner* — Alex W Lam
(74) *Attorney, Agent, or Firm* — Rimon P.C.

(57) ABSTRACT

The electricity storage device control circuit includes a voltage detector and a voltage controller. The voltage detector is configured to detect voltages of a plurality of electricity storage devices. The voltage controller is configured to individually control the voltages of the plurality of electricity storage devices by performing, based on a detection result by the voltage detector, at least one of discharging or charging of electrostatic energy stored in the plurality of electricity storage devices.

19 Claims, 14 Drawing Sheets

(56) References Cited

U.S. PATENT DOCUMENTS

| | | | |
|---|---|---|---|
| 2018/0309172 A1* | 10/2018 | Ito | H02J 7/0063 |
| 2018/0331566 A1 | 11/2018 | Sato | |
| 2020/0059107 A1* | 2/2020 | Fukushima | H01M 50/209 |
| 2020/0335985 A1* | 10/2020 | Ikemoto | H01M 10/441 |
| 2020/0403277 A1 | 12/2020 | Tsukamoto et al. | |

FOREIGN PATENT DOCUMENTS

| | | |
|---|---|---|
| JP | 2020-005481 A | 1/2020 |
| JP | 2020-156119 A | 9/2020 |
| WO | 2019/013077 A1 | 1/2019 |
| WO | 2019/189161 A1 | 10/2019 |
| WO | 2020/008732 A1 | 1/2020 |
| WO | 2021/200774 A1 | 10/2021 |

* cited by examiner

ELECTRICITY STORAGE DEVICE CONTROL CIRCUIT AND BACKUP POWER SUPPLY SYSTEM INCLUDING SAME

CROSS-REFERENCE OF RELATED APPLICATIONS

This application is the U.S. National Phase under 35 U.S.C. § 371 of International Patent Application No. PCT/JP2021/047003, filed on Dec. 20, 2021, which in turn claims the benefit of Japanese Patent Application No. 2020-218538, filed on Dec. 28, 2020, the entire disclosures of which Applications are incorporated by reference herein.

TECHNICAL FIELD

The present disclosure relates to electricity storage device control circuits and backup power supply systems including the electricity storage device control circuits, and specifically, to an electricity storage device control circuit configured to control a voltage of an electricity storage device and a backup power supply system including the electricity storage device control circuit.

BACKGROUND ART

A power supply circuit is known which is configured to supply electricity from a backup power supply to a load when supply of electricity from a direct-current power supply to the load is stopped (e.g., Patent Literature 1).

CITATION LIST

Patent Literature

Patent Literature 1: JP 2020-5481 A

SUMMARY OF INVENTION

When the backup power supply used for the power supply circuit includes a plurality of electricity storage devices connected in series to each other, a voltage variation which may occur between the plurality of electricity storage devices may vary the deterioration speed of the plurality of electricity storage devices and may thus accelerate the performance deterioration of the backup power supply. Therefore, consideration has to be given to reducing the voltage variation between the plurality of electricity storage devices.

An object of the present disclosure is to provide an electricity storage device control circuit configured to reduce a voltage variation between a plurality of electricity storage devices and a backup power supply system including the electricity storage device control circuit.

An electricity storage device control circuit according to an aspect of the present disclosure includes a voltage detector and a voltage controller. The voltage detector is configured to detect voltages of a plurality of electricity storage devices. The voltage controller is configured to individually control the voltages of the plurality of electricity storage devices by performing, based on a detection result by the voltage detector, at least one of discharging electrostatic energy stored in the plurality of electricity storage devices or charging electrostatic energy into the plurality of electricity storage devices.

A backup power supply system according to an aspect of the present disclosure includes the electricity storage device control circuit and the plurality of electricity storage devices. The plurality of electricity storage devices are configured to be charged by a primary power supply configured to supply electric power to a load. The backup power supply system is configured to supply electric power to the load from the plurality of electricity storage devices when the primary power supply fails.

The present disclosure provides the advantage that a voltage variation between a plurality of electricity storage devices can be reduced.

DESCRIPTION OF EMBODIMENTS

An electricity storage device control circuit 1 according to an embodiment of the present disclosure and a backup power supply system 2 including the electricity storage device control circuit 1 will be described in detail with reference to the drawings. Note that the embodiment and variations described below are mere examples of the present disclosure, and the present disclosure is not limited to the embodiment and the variations. The present disclosure may be modified variously without departing from the scope of the present disclosure, even if not including the embodiment and variations, according to a design or the like.

(1) Overview

First of all, an overview of the electricity storage device control circuit 1 and the backup power supply system 2 of the present embodiment will be described with reference to FIG. 1.

Figure 1:
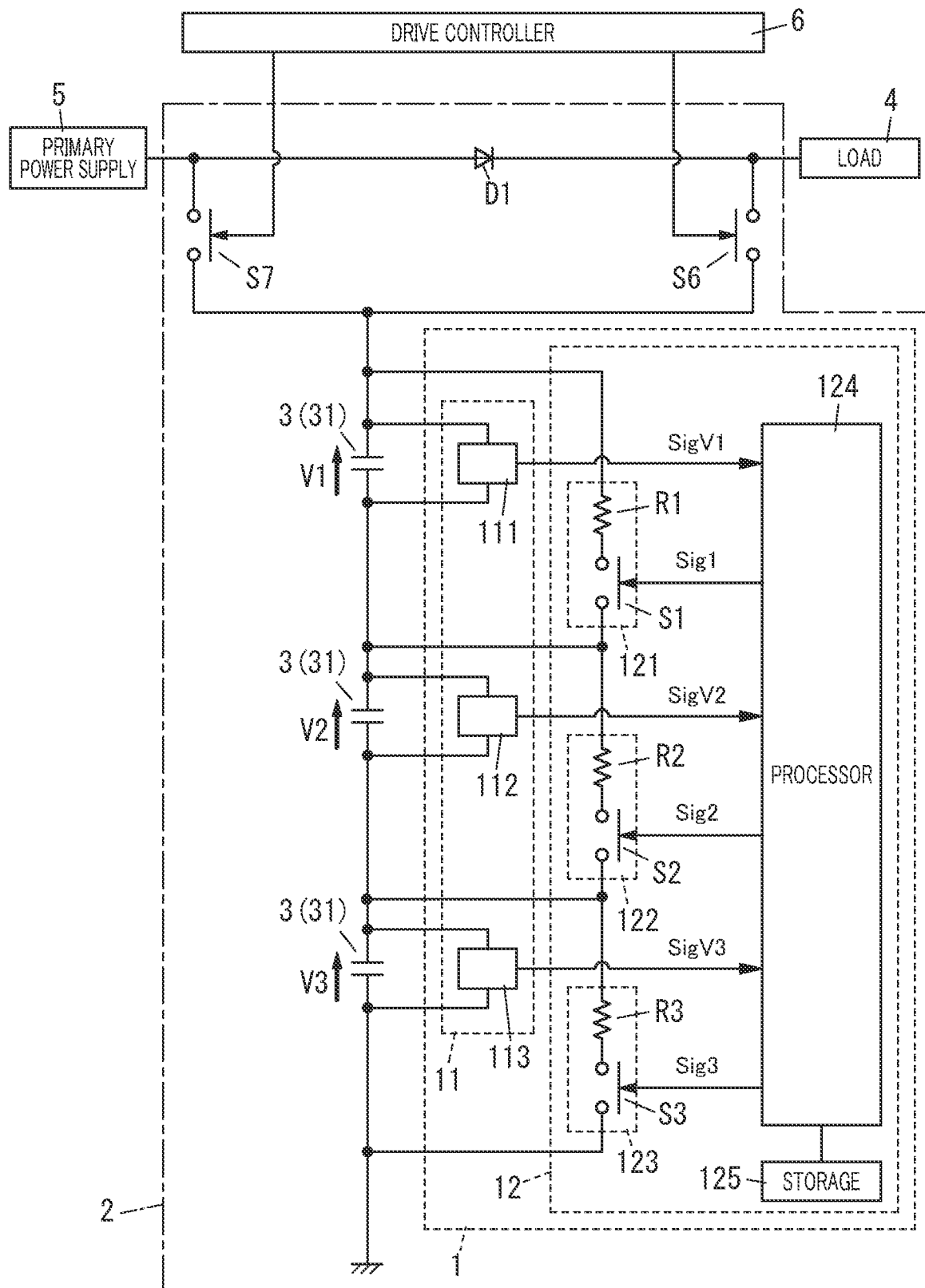
FIG. 1 is a schematic circuit diagram of a configuration of a backup power supply system including an electricity storage device control circuit according to an embodiment of the present disclosure in a discharge mode.

As shown in FIG. 1, the electricity storage device control circuit 1 is a control circuit which controls respective voltages of a plurality of electricity storage devices 3. The backup power supply system 2 including the electricity storage device control circuit 1 and the plurality of electricity storage devices 3 may be mounted on, for example, a moving vehicle such as an automobile so as to be used as a backup power supply of a load 4 such as a brake device. The backup power supply system 2 is charged by a primary power supply 5 configured to supply electric power to the load 4, and when the primary power supply 5 fails, the backup power supply system 2 supplies electric power from the plurality of electricity storage devices 3 to the load 4. Note that between the primary power supply 5 and the load 4, a backflow preventer configured to prevent a current from flowing from the plurality of electricity storage devices 3 into the primary power supply 5 is provided. The backflow preventer is, for example, a diode D1. The backup power supply system 2 may further include a circuit breaker S6 disposed between the load 4 and the plurality of electricity storage devices 3 and a circuit breaker S7 disposed between the primary power supply 5 and the plurality of electricity storage devices 3.

The primary power supply 5 continues charging the plurality of electricity storage devices 3 until the total voltage of the plurality of electricity storage devices 3 equals the voltage of the primary power supply 5 or reaches a preset voltage. When the charging of the plurality of electricity storage devices 3 is completed, the amounts of electrostatic energy stored in the plurality of electricity storage devices 3 are equal. Here, the plurality of electricity storage devices 3 vary in electrostatic capacitance due to production tolerance, deterioration, or the like. The variation in the electrostatic capacitance causes a voltage variation between the plurality of electricity storage devices 3 even when the plurality of electricity storage devices 3 store the equal amounts of electrostatic energy. Charging the plurality of electricity storage devices 3 having voltages varying from each other may results in that one or more electricity storage devices 3 of the plurality of electricity storage devices 3 go into over-voltage. If the one or more electricity storage devices 3 are left under over-voltage conditions for a long period of time, their deterioration may progress. Therefore, to correct the voltage variation between the plurality of electricity storage devices 3, cell balancing has to be performed accordingly. In the present embodiment, the electricity storage device control circuit 1 performs the cell balancing of the plurality of electricity storage devices 3 as shown in FIG. 1.

The electricity storage device control circuit 1 includes a voltage detector 11 and a voltage controller 12. The voltage detector 11 detects the voltages of the plurality of electricity storage devices 3. The voltage controller 12 individually controls the voltages of the plurality of electricity storage devices 3 by performing, based on a detection result by the voltage detector 11, at least one of discharging electrostatic energy stored in the plurality of electricity storage devices 3 or charging electrostatic energy into the plurality of electricity storage devices 3. That is, the voltage controller 12 selects, with reference to values of the voltages of the plurality of electricity storage devices 3 detected by the voltage detector 11, one or more electricity storage devices 3 which require a voltage correction. Then, the voltage controller 12 adjusts the amount of the electrostatic energy stored in the one or more electricity storage devices 3 thus selected by performing at least one of the discharge or the charge, thereby controlling the voltage or voltages respectively of the one or more electricity storage devices 3 thus selected. Thus, the cell balancing of the plurality of electricity storage devices 3 is performed.

Figure 2:
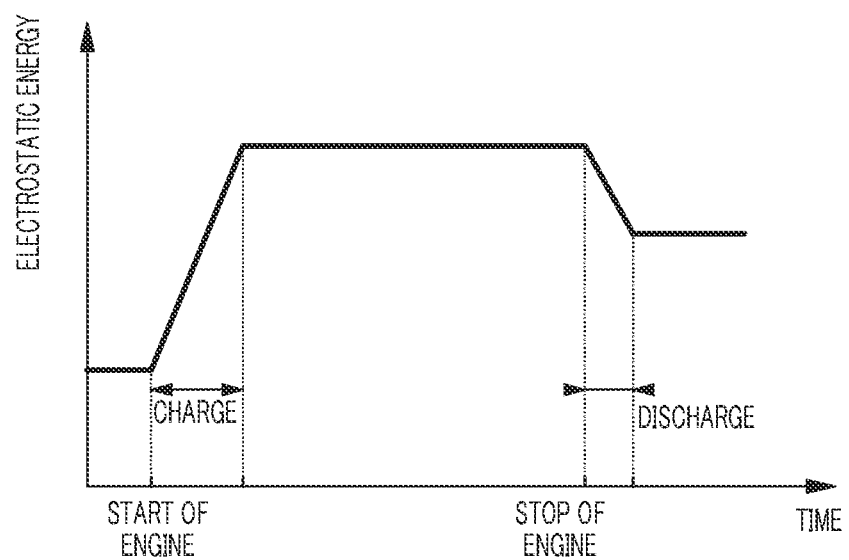
FIG. 2 is a graph illustrating control when the backup power supply system is mounted on an automobile.

For example, when the backup power supply system 2 is mounted on a moving vehicle such as an automobile, the primary power supply 5 is connected to the plurality of electricity storage devices 3 in response to the start of an engine of the automobile, thereby charging the plurality of electricity storage devices 3 as show in FIG. 2. Here, the electricity storage device control circuit 1 charges the electricity storage devices 3 with the electrostatic energy, thereby performing the cell balancing of the electricity storage devices 3 to equalize the voltages of the electricity storage devices 3. Moreover, in response to the stop of the engine of the automobile, the primary power supply 5 is disconnected from the plurality of electricity storage devices 3. Here, the electricity storage device control circuit 1 discharges the electrostatic energy from the electricity storage device 3, thereby performing the cell balancing of the electricity storage device 3 to keep the voltages of the electricity storage devices 3 in an equalized state.

(2) Details

The electricity storage device control circuit 1 and the backup power supply system 2 according to the present embodiment will be descried in detail below with reference to FIGS. 1 to 5.

(2.1) Electricity Storage Device

The plurality of electricity storage devices 3 included in the backup power supply system 2 are connected in series to each other and are used as backup power supplies for the load 4. The plurality of electricity storage devices 3 include an electric double-layer capacitor.

As shown in FIG. 1, three electricity storage devices 3 (31 to 33) are connected in series to each other, and all the electricity storage devices 3 are electric double-layer capacitors in the present embodiment. Note that the number of electricity storage devices 3 and the number of electricity storage devices 3, which are electric double-layer capacitors, of the plurality of electricity storage devices 3 are not limited to the present embodiment and may accordingly be changed.

Figure 4:
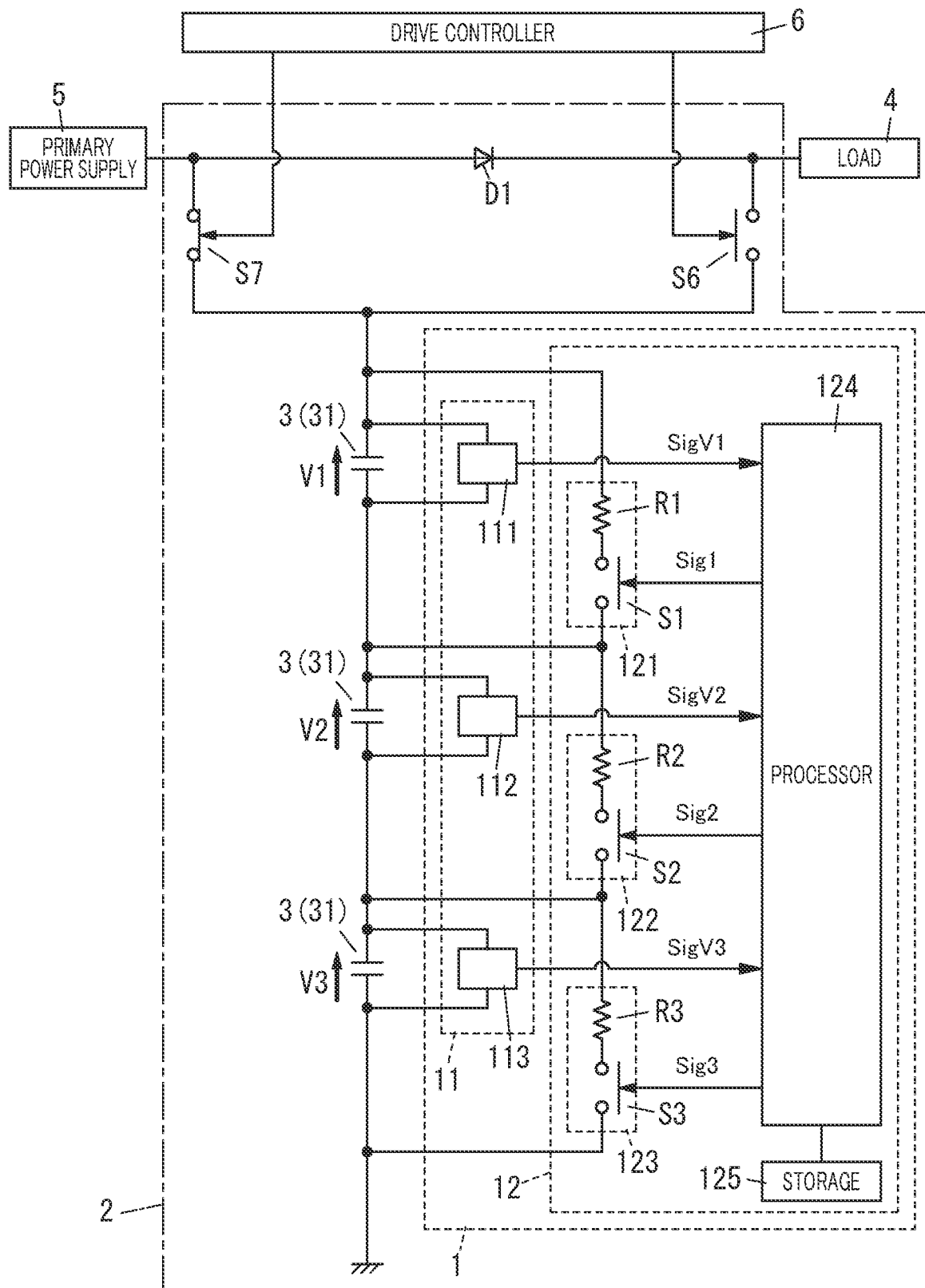
FIG. 4 is a schematic circuit diagram of the configuration of the backup power supply system including the electricity storage device control circuit in a charge mode.

In the present embodiment, the circuit breaker S6 is disposed between the load 4 and the electricity storage devices 31 to 33, and when the primary power supply 5 fails, the circuit breaker S6 is switched on to supply electric power to the load 4 from the electricity storage devices 31 to 33. Except for when the primary power supply 5 fails, the circuit breaker S6 is off. The circuit breaker S6 is, for example, a semiconductor switch, and as shown in FIGS. 1 and 4, switching on and off of the circuit breaker S6 is controlled by a drive controller 6. The drive controller 6 performs control such that the circuit breaker S6 is off while the primary power supply 5 does not fail and the circuit breaker S6 is switched on when the drive controller 6 detects the failure of the primary power supply 5.

The electricity storage devices 31 to 33 are charged by the primary power supply 5, which is a direct-current power supply. In the present embodiment, the circuit breaker S7 is disposed between the primary power supply 5 and the electricity storage device 31. The circuit breaker S7 is, for example, a semiconductor switch. The drive controller 6 performs control such that the circuit breaker S7 is switched on while the primary power supply 5 does not fail. When the circuit breaker S7 is switched on, the electricity storage devices 31 to 33 are connected in series to the primary power supply 5, and the electricity storage devices 31 to 33 are thus charged.

After the circuit breaker S7 is switched on, when the total voltage of the electricity storage devices 31 to 33 equals the voltage of the primary power supply 5, or when the circuit breaker S7 is switched off, charging the electricity storage devices 31 to 33 ends.

Note that in the present embodiment, the drive controller 6 is disposed as a member separate from the backup power supply system 2. However, the drive controller 6 may be included in the backup power supply system 2.

(2.2) Voltage Detector

The voltage detector 11 included in the electricity storage device control circuit 1 includes three voltage sensors 111 to 113 respectively connected to the electricity storage devices 31 to 33 as shown in FIG. 1. The voltage sensors 111 to 113 are connected to a positive electrode terminal and a negative electrode terminal of the electricity storage devices 31 to 33, respectively and detects voltages V1 to V3 of the electricity storage devices 31 to 33, respectively.

Moreover, the voltage sensors 111 to 113 transmit signals representing the voltages V1 to V3 of the electricity storage devices 31 to 33 thus detected to the voltage controller 12 which will be described later.

(2.3) Voltage Controller

In the present embodiment, the voltage controller 12 included in the electricity storage device control circuit 1 performs the cell balancing by performing at least one of discharging electrostatic energy stored in the electricity storage devices 31 to 33 or charging electrostatic energy into the electricity storage devices 31 to 33 such that the voltages of the electricity storage devices 31 to 33 are equalized. Note that the cell balancing as used herein refers to reducing the voltage variation between the plurality of electricity storage devices 3.

The voltage controller 12 includes three control circuits 121 to 123 respectively connected in parallel to the electricity storage devices 31 to 33 as shown in FIG. 1. Each of the three control circuits 121 to 123 includes a resistor and a circuit breaker connected in series to each other. In the following description, the resistors included in the control circuits 121 to 123 are respectively referred to as resistors R1 to R3, and the circuit breakers included in the control circuits 121 to 123 are respectively referred to as circuit breakers S1 to S3. Here, the circuit breakers S1 to S3 are, for example, semiconductor switches.

The voltage controller 12 further includes a processor 124 and a storage 125 as shown in FIG. 1.

The processor 124 is connected to the voltage sensors 111 to 113 of the voltage detector 11 and receives signals SigV1 to SigV3 respectively representing the voltages V1 to V3 of the electricity storage devices 31 to 33 from the voltage sensors 111 to 113. In addition, the processor 124 is connected to the circuit breakers S1 to S3, and based on detection results of the voltages V1 to V3, the processor 124 individually controls switching on and off of the circuit breakers S1 to S3 respectively by control signals Sig1 to Sig3.

The processor 124 includes, as a main component, a computer system including memory and a processor, for example. That is, the processor executes a program stored in the memory of the computer system, thereby implementing the function of the processor 124. The program may be stored in the memory in advance, may be provided over a telecommunications network such as the Internet, or may be provided as a non-transitory storage medium, such as a memory card, storing the program.

The storage 125 is connected to the processor 124 and stores, for example, a set voltage to be compared with the voltages V1 to V3 when the processor 124 controls, based on the detection results of the voltages V1 to V3, switching on and off of the circuit breakers S1 to S3. Note that the storage 125 includes rewritable nonvolatile memory such as Electrically Erasable Programmable Read-Only Memory (EEPROM) or flash memory.

(3) Operation

In the backup power supply system 2 of the present embodiment, the electricity storage device control circuit 1 performs the cell balancing of the electricity storage devices 31 to 33.

In the present embodiment, the cell balancing is performed by different operation between a discharge mode M1 in which the electricity storage devices 31 to 33 are not connected to the primary power supply 5 and a charge mode M2 in which the electricity storage devices 31 to 33 are connected to the primary power supply 5.

The cell balancing operation in the discharge mode M1 and the cell balancing operation in the charge mode M2 will be described below with reference to FIGS. 1 to 5.

(3.1) Cell Balancing Operation in Discharge Mode

In the discharge mode M1 in which the electricity storage devices 31 to 33 are not connected to the primary power supply 5, the voltage controller 12 switches on and off the circuit breakers S1 to S3 respectively included in the control circuits 121 to 123 to control the amount of electrostatic energy discharged from the electricity storage devices 31 to 33. Thus, the voltage controller 12 performs the cell balancing of the electricity storage devices 31 to 33. The cell balancing operation by the voltage controller 12 when the electricity storage devices 31 to 33 are in the discharge mode M1 will be described below with reference to FIGS. 1 to 3.

As shown in FIG. 1, the discharge mode M1 in which the electricity storage devices 31 to 33 are not connected to the primary power supply 5 is a state where the circuit breaker S7 is off. In the discharge mode M1, the electricity storage devices 31 to 33 are not charged by the primary power supply 5. Moreover, in the discharge mode M1, the circuit breakers S1 to S3 respectively included in the control circuits 121 to 123 are off except for when the cell balancing is performed.

First of all, the processor 124 included in the voltage controller 12 receives, at a predetermined period, the signals SigV1 to SigV3 respectively representing the voltages V1 to V3 of the electricity storage devices 31 to 33 from the voltage sensors 111 to 113 of the voltage detector 11. When the processor 124 receives the signals SigV1 to SigV3, the processor 124 compares the voltages V1 to V3 with the respective set voltages of the electricity storage devices 31 to 33 stored in the storage 125 (FIG. 3 ST1).

For example, the respective set voltages of the electricity storage devices 31 to 33 are all a set voltage V0 in the present embodiment. The set voltage V0 is, for example, set to a voltage value which is about ⅓ of the voltage of the primary power supply 5. Here, the processor 124 selects an electricity storage device(s) 3 having a voltage higher than the set voltage V0 as a target(s) to be subjected to the cell balancing by discharging. For example, when the relationship among the voltages V1 to V3 is expressed as V1>V2>V3=V0, the processor 124 selects the electricity storage device 31 and the electricity storage device 32 as targets to be subjected to voltage control by discharging (FIG. 3 ST2).

The processor 124 then switches the circuit breakers S1 and S2 respectively included in the control circuits 121 and 122 respectively corresponding to the electricity storage devices 31 and 32 from off to on respectively by the control signals Sig1 and Sig2. Thus, the electrostatic energy stored in the electricity storage devices 31 to 32 is consumed respectively by the resistors R1 and R2 respectively included in the control circuits 121 and 122, and the voltages V1 and V2 respectively of the electricity storage devices 31 and 32 decrease (FIG. 3 ST3).

Figure 3:
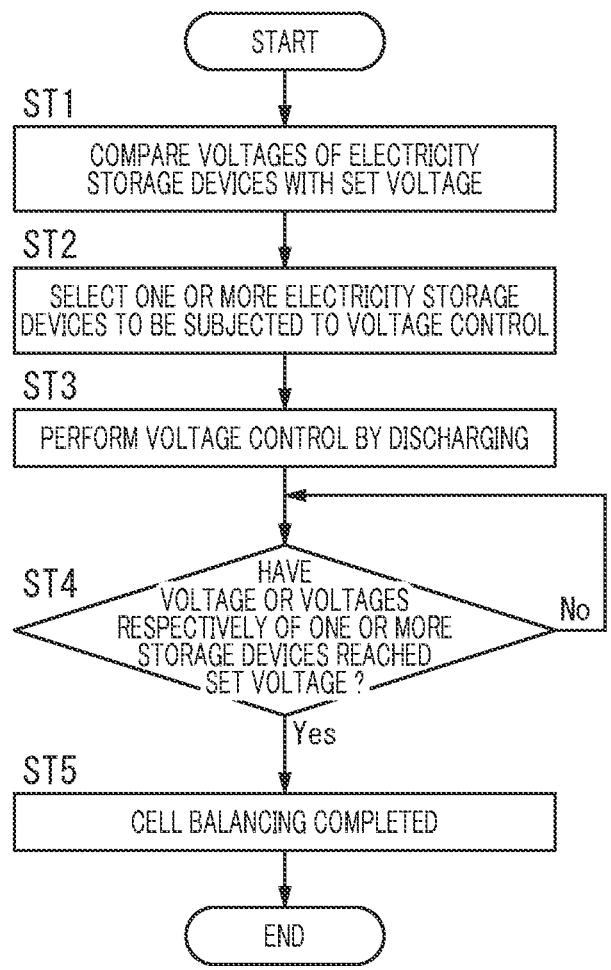
FIG. 3 is a flowchart illustrating cell balancing operation of the electricity storage device control circuit in the discharge mode.

Here, when the voltages V1 and V2 reach the set voltage V0 (FIG. 3 ST4: YES), the processor 124 individually controls the circuit breakers S1 and S2 respectively by the control signals Sig1 and Sig2 such that the circuit breakers S1 and S2 are switched off to stop controlling the voltages V1 and V2. That is, the electricity storage devices 31 and 32 are respectively disconnected from the resistors R1 and R2, which stops discharging the electricity storage devices 31 and 32, and the voltages V1 and V2 are thus kept at the set voltage V0. Here, the circuit breaker S3 corresponding to the electricity storage device 33 remains off, the voltage V3 of the electricity storage device 33 is kept unchanged from that before the cell balancing, and the relationship that V3=V0 is kept as it is. In this way, the voltages V1 to V3 are in the relationship that V1=V2=V3=V0, and the processor 124 stops controlling the electricity storage devices 31 to 33, thereby completing the cell balancing (FIG. 3 ST5). Note that respective set voltages different from each other may be set for the electricity storage devices 3. Moreover, the present embodiment is not limited to that the control is stopped when the voltages V1 to V3 are adjusted to a voltage exactly equal to the set voltage V0, but the control may be stopped when the difference from the set voltage V0 is less than or equal to a prescribed error voltage.

For example, when the backup power supply system 2 is mounted on a moving vehicle such as an automobile, the circuit breaker S7 is switched off in response to the stop of the engine as described above. That is, the primary power supply 5 is disconnected from the electricity storage devices 31 to 33 in response to the stop of the engine, and the electricity storage devices 31 to 33 enter the discharge mode M1 as shown in FIG. 2, thereby performing the cell balancing by discharging the electricity storage devices 31 to 33.

In the present embodiment, the circuit breakers S1 to S3 are all off after the cell balancing is performed in the discharge mode M1, and therefore, the electrostatic energy stored in the electricity storage devices 31 to 33 is less likely to be lost by discharging. This provides the advantage that when the electricity storage devices 31 to 33 are charged by connecting to the primary power supply 5, a time required to fully charge the electricity storage devices 31 to 33 is reduced.

(3.2) Cell Balancing Operation in Charge Mode

In the charge mode M2 in which the electricity storage devices 31 to 33 are connected to the primary power supply 5, the voltage controller 12 switches on and off the circuit breakers S1 to S3 respectively included in the control circuits 121 to 123 to control the amount of electrostatic energy to be charged into the electricity storage devices 31 to 33. Thus, the voltage controller 12 performs the cell balancing of the electricity storage devices 31 to 33. The cell balancing operation by the voltage controller 12 when the electricity storage devices 31 to 33 are in the charge mode M2 will be described below with reference to FIGS. 4 and 5.

As shown in FIG. 4, the charge mode M2 in which the electricity storage devices 31 to 33 are connected in series to the primary power supply 5 is a state where the circuit breaker S7 is on. Here, the electricity storage devices 31 to 33 are charged by the primary power supply 5. Moreover, also in the charge mode M2, the circuit breakers S1 to S3 respectively included in the control circuits 121 to 123 are off except for when the cell balancing is performed.

When the total voltage of the electricity storage devices 31 to 33 substantially equals the voltage of the primary power supply 5 immediately before charge completion of the electricity storage devices 31 to 33, a current flowing through the electricity storage devices 31 to 33 becomes very small. This state is referred to as a float charge mode. Here, switching on and off the circuit breakers S1 to S3 applies a voltage from the primary power supply 5 to the resistors R1 to R3 respectively included in the control circuits 121 to 123 to cause a current to flow.

First of all, the processor 124 included in the voltage controller 12 receives, at a predetermined period, the signals SigV1 to SigV3 representing the voltages V1 to V3 respectively of the electricity storage devices 31 to 33 from the voltage sensors 111 to 113 of the voltage detector 11. In the float charge mode after a definite time period has elapsed since the electricity storage devices 31 to 33 entered the charge mode M2 (FIG. 5 ST10: YES), when the processor 124 receives the signals SigV1 to SigV3, the processor 124 compares the voltages V1 to V3 with the respective set voltages of the electricity storage devices 31 to 33 stored in the storage 125 (FIG. 5 ST11).

For example, the respective set voltages of the electricity storage devices 31 to 33 are all a set voltage V0 in the present embodiment. Here, the processor 124 selects an electricity storage device(s) 3 having a voltage lower than the set voltage V0 as a target(s) to be subjected to the cell balancing by charging. For example, when the relationship among the voltages V1 to V3 is expressed as V1=V2=V0>V3, the processor 124 selects the electricity storage device 33 as a target to be subjected to voltage control by charging (FIG. 5 ST12).

The processor 124 then switches on the circuit breakers S1 and S2 except for the circuit breaker S3 included in the control circuit 123 corresponding to the electricity storage device 33 by the control signals Sig1 and Sig2. Here, the circuit breaker S3 remains off. Thus, a current flowing through the resistors R1 to R3 flows from the resistors R1 and R2 into the electricity storage device 33. The electricity storage device 33 is charged by the current flowing thereinto from the resistors R1 and R2, and the voltage V3 of the electricity storage device 33 increases relative to the voltages V1 and V2 (FIG. 5 ST13).

Figure 5:
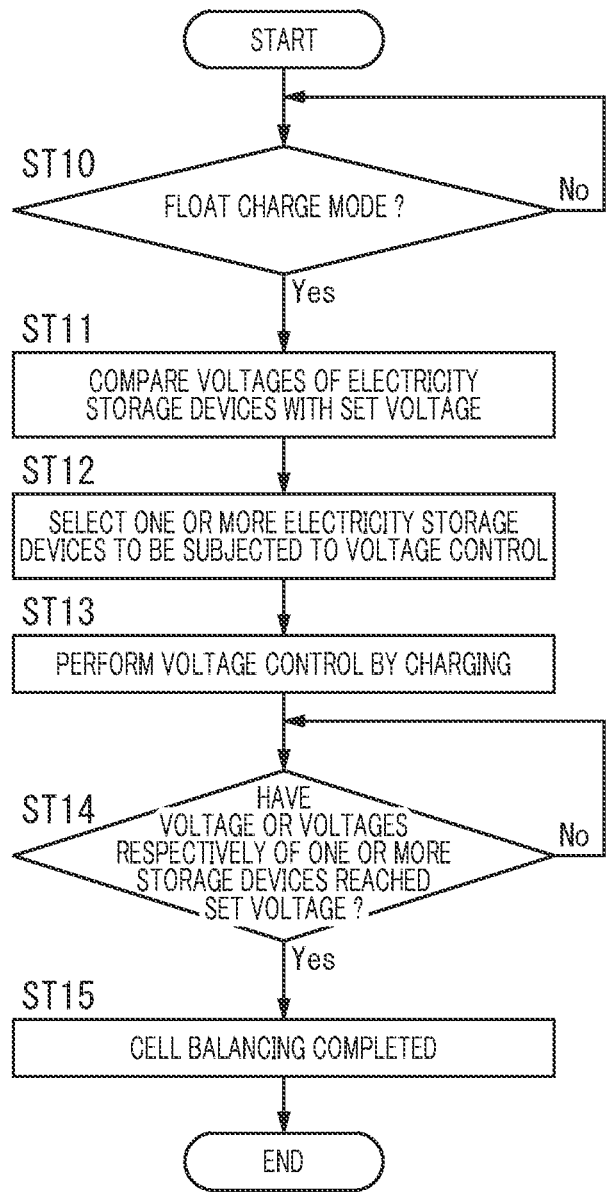
FIG. 5 is a flowchart illustrating cell balancing operation of the electricity storage device control circuit in the charge mode.

When the voltage V3 reaches the set voltage V0 (FIG. 5 ST14: YES), the processor 124 switches off the circuit breakers S1 and S2 by the control signals Sig1 and Sig2 to stop controlling the voltage V3. Thus, the voltage V3 is kept at the set voltage V0. Here, the voltages V1 and V2 of the electricity storage devices 31 and 32 are kept unchanged from that before the cell balancing, and the relationship that V1=V2=V0 is kept as it is. In this way, the voltages V1 to V3 are in the relationship that V1=V2=V3=V0, and the processor 124 stops controlling the electricity storage devices 31 to 33, thereby completing the cell balancing (FIG. 5 ST15). Note that respective set voltages different from each other may be set for the electricity storage devices 3.

For example, when the backup power supply system 2 is mounted on a moving vehicle such as an automobile, the circuit breaker S7 is switched on in response to the start of the engine as described above. That is, the primary power supply 5 is connected to the electricity storage devices 31 to 33 in response to the start of the engine, and the electricity storage devices 31 to 33 enter the charge mode M2 as shown in FIG. 2, thereby allowing the cell balancing by charging in the float charge mode immediately before charge completion.

(4) Variations

Variations of an electricity storage device control circuit 1 of the embodiment described above will be described below. Note that component common with those in the electricity storage device control circuit 1 of the embodiment described above are denoted by the same reference signs, and the description thereof will be accordingly omitted. Moreover, each of configurations of the variations described below may be applicable in combination with the configuration of the embodiment described above.

(4.1) First Variation

An electricity storage device control circuit 1 according to a first variation will be described below.

In the electricity storage device control circuit 1 of the embodiment described above, the voltage controller 12 stops controlling the voltages of the electricity storage devices 31 to 33 when the voltages of the electricity storage devices 31 to 33 reach their respective set voltages.

The first variation is different from the embodiment described above in that the voltage controller 12 stops controlling the voltages of the electricity storage devices 31 to 33 when the absolute value of a voltage difference among the electricity storage devices 31 to 33 is within a set voltage difference. The cell balancing operation of the voltage controller 12 in the discharge mode M1 and the charge mode M2 of the first variation will be described below with reference to FIGS. 1 and FIGS. 4 to 12.

(4.1 1) Cell Balancing Operation in Discharge Mode of First Variation

In the first variation, the processor 124 included in the voltage controller 12 first receives, at a predetermined period, the signals SigV1 to SigV3 representing the voltages V1 to V3 respectively of the electricity storage devices 31 to 33 from the voltage sensors 111 to 113 of the voltage detector 11 in the discharge mode M1 as shown in FIG. 1. When the processor 124 receives the signals SigV1 to SigV3, the processor 124 obtains absolute values of the voltage difference among the voltages V1 to V3, that is, dV12=|V1−V2|, dV13=|V1−V3|, and dV23=|V2−V3| (FIG. 6 ST20).

Here, when all of the absolute values dV12, dV13, and dV23 are not within a set voltage difference dV0 stored in the storage 125, the processor 124 selects two electricity storage devices 3 between which the absolute value of the voltage difference is largest as a target to be subjected to voltage difference control by discharging. For example, as shown in FIG. 7, when V1=4 (V), V2=5 (V), and V3=2 (V), dV12=1 (V), dV13=2 (V), and dV23=3 (V). Here, for example, when dV0=1 (V), each of dV13 and dV23 is not within dV0=1 (V) (FIG. 6 ST21: NO). Thus, the processor 124 selects the electricity storage devices 32 and 33 between which the voltage difference is largest as the target to be subjected to the voltage difference control by discharging (FIG. 6 ST23).

The processor 124 then switches the circuit breaker S2 from off to on by the control signal Sig2. The circuit breaker S2 is included in the control circuit 122 corresponding to the electricity storage device 32, which has a larger voltage, of the electricity storage devices 32 and 33 thus selected. Thus, electrostatic energy stored in the electricity storage device 32 is consumed by the resistor R2 included in the control circuit 122, and thereby, the voltage V2 of the electricity storage device 32 decreases as shown in FIGS. 7 and 8 (FIG. 6 ST24).

Figure 6:
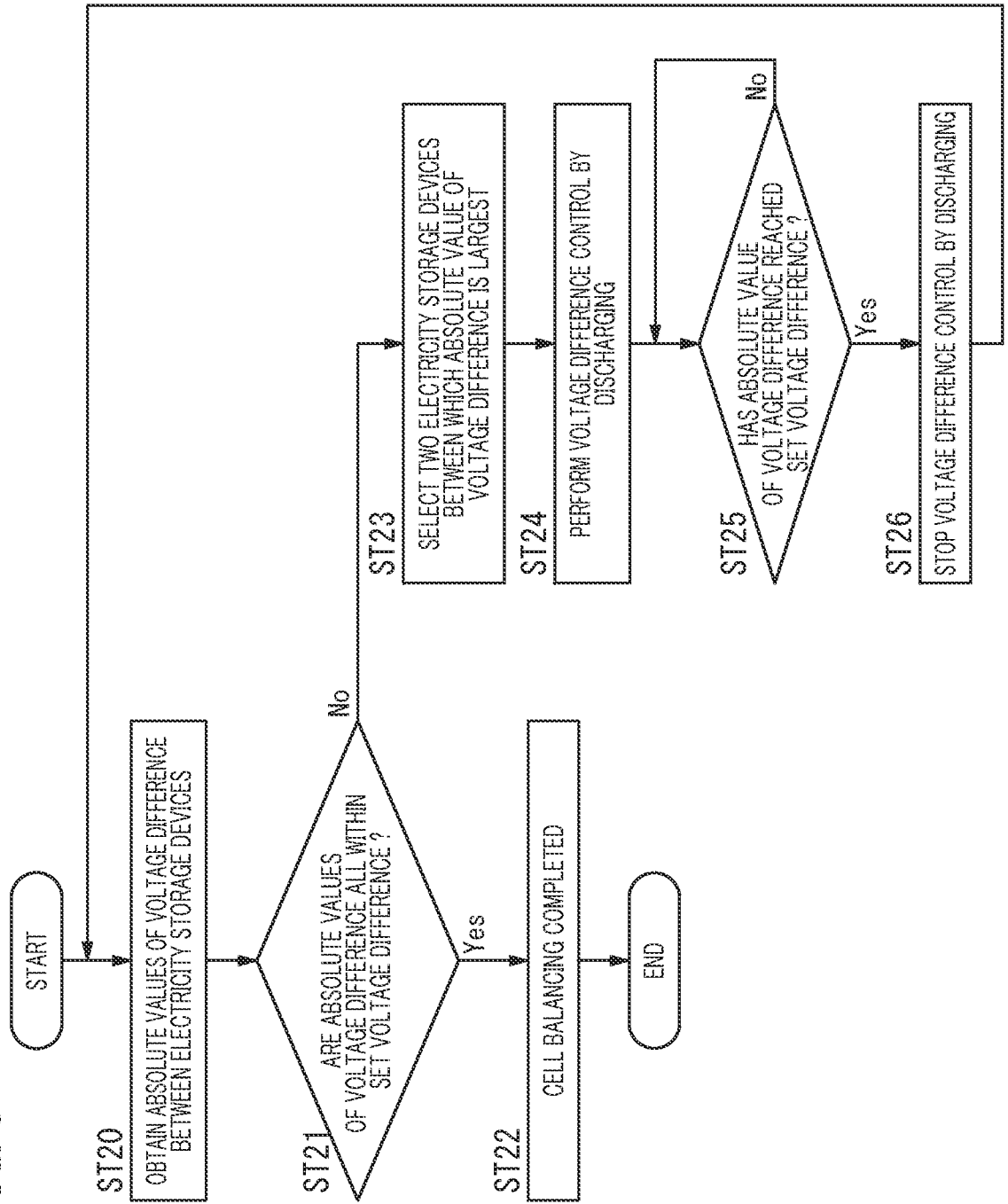
FIG. 6 is a flowchart illustrating cell balancing operation of an electricity storage device control circuit of a first variation in the discharge mode.
Figure 7:
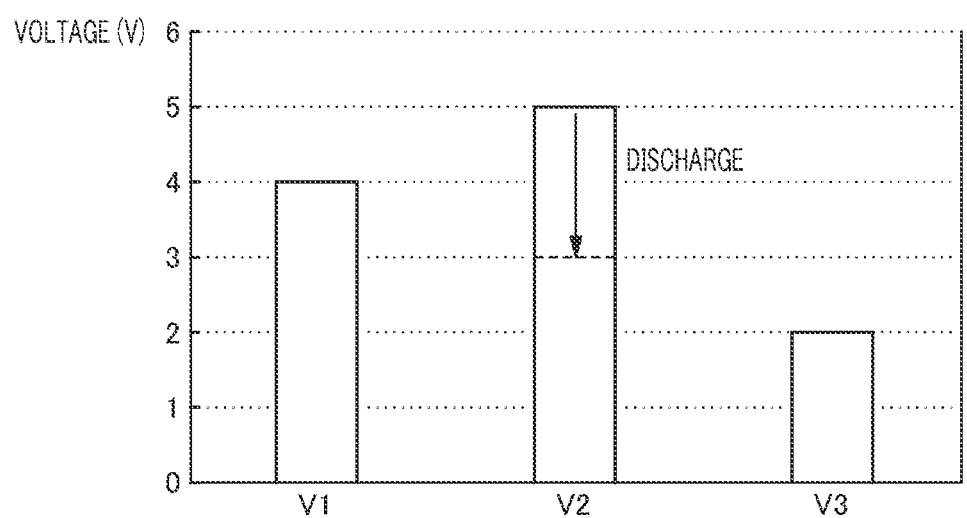
FIG. 7 is a graph illustrating cell balancing operation of the electricity storage device control circuit of the first variation in the discharge mode.

Here, when the voltage V2 decreases to V2=3 (V), dV23=1 (V) holds true, and dV23 is thus within dV0=1 (V) (FIG. 6 ST25: YES), the processor 124 switches off the circuit breaker S2 to stop controlling the electricity storage device 32. That is, the voltage difference control by discharging the electricity storage devices 32 and 33 is stopped (FIG. 6 ST26).

The processor 124 then calculates dV12, dV13, and dV23 (FIG. 6 ST20).

Figure 8:
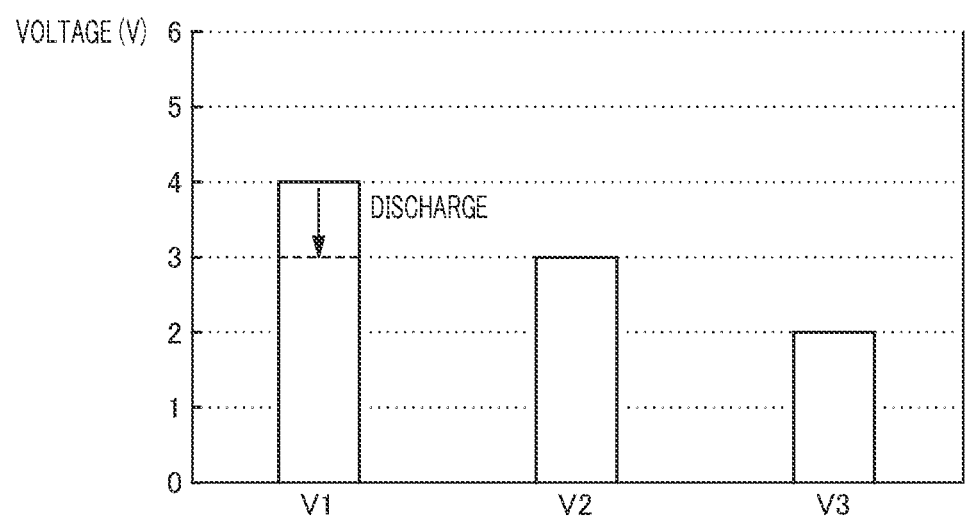
FIG. 8 is a graph illustrating cell balancing operation of the electricity storage device control circuit of the first variation in the discharge mode.

Here, as shown in FIG. 8, V1=4 (V), V2=3 (V), and V3=2 (V), and therefore, dV12=1 (V), dV13=2 (V), and dV23=1 (V). Thus, dV13 is not within dV0=1 (V) (FIG. 6 ST21: NO). Thus, the processor 124 selects the electricity storage devices 31 and 33 between which the absolute value of the voltage difference is largest as the target to be subjected to the voltage difference control by discharging (FIG. 6 ST23).

Moreover, the processor 124 switches the circuit breaker S1 from off to on by the control signal Sig1. The circuit breaker S1 is included in the control circuit 121 corresponding to the electricity storage device 31, which has a larger voltage, of the electricity storage devices 31 and 33 thus selected. Thus, electrostatic energy stored in the electricity storage device 31 is consumed by the resistor R1 included in the control circuit 121, and thereby, the voltage V1 of the electricity storage device 31 decreases as shown in FIGS. 8 and 9 (FIG. 6 ST24).

Here, when the voltage V1 decreases to V1=3 (V), dV13=1 (V) holds true, and dV13 is thus within dV0=1 (V)(FIG. 6 ST25: YES), the processor 124 switches off the circuit breaker S1 to stop controlling the electricity storage device 31. That is, the voltage difference control by discharging the electricity storage devices 31 and 33 is stopped (FIG. 6 ST26).

The processor 124 then calculates dV12, dV13, and dV23 (FIG. 6 ST20).

Figure 9:
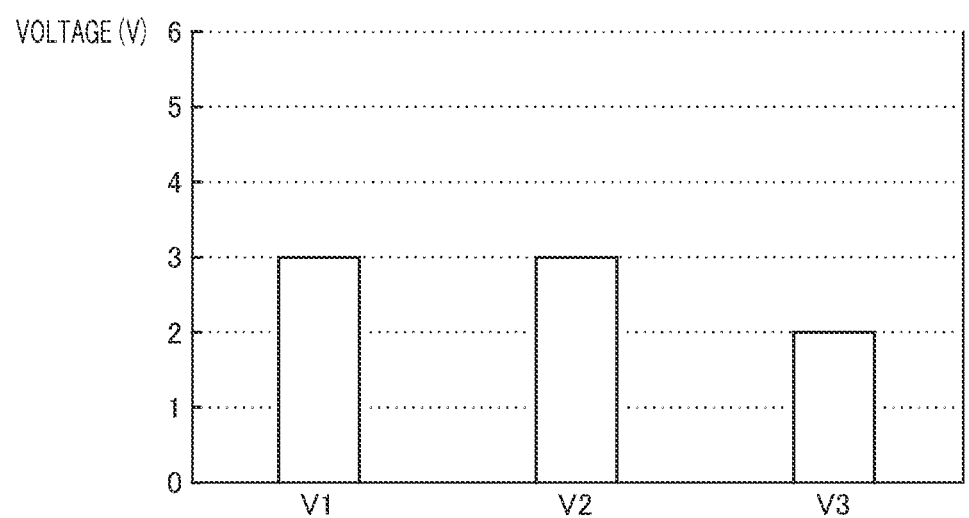
FIG. 9 is a graph illustrating cell balancing operation of the electricity storage device control circuit of the first variation in the discharge mode.

Here, as shown in FIG. 9, V1=3 (V), V2=3 (V), and V3=2 (V), and thus, dV12=0 (V), dV13=1 (V), and dV23=1 (V). All of dV12, dV13, and dV23 are thus within dV0=1(V) (FIG. 6 ST21: YES). In this case, the processor 124 stops controlling the electricity storage devices 31 to 33, and the cell balancing is completed (FIG. 6 ST22).

(4.1.2) Cell Balancing Operation in Charge Mode of First Variation

In the first variation, the processor 124 included in the voltage controller 12 first receives, at a predetermined period, the signals SigV1 to SigV3 representing the voltages V1 to V3 respectively of the electricity storage devices 31 to 33 from the voltage sensors 111 to 113 of the voltage detector 11 in the charge mode M2 as shown in FIG. 4. In the electricity storage devices 31 to 33 being in the float charge mode immediately before charge completion (FIG. 10 ST30), when the processor 124 receives the signals SigV1 to SigV3, the processor 124 calculates absolute values of the voltage difference among the voltages V1 to V3, that is, dV12=|V1−V2|, dV13=|V1−V3|, and dV23=|V2−V3|, (FIG. 10 ST31).

Here, when all of the absolute values dV12, dV13, and dV23 are not within a set voltage difference dV0 stored in the storage 125, the processor 124 selects two electricity storage devices 3 between which the absolute value of the voltage difference is largest as a target to be subjected to voltage difference control by charging. For example, as shown in FIG. 11, when V1=4 (V), V2=5 (V), and V3=2 (V), dV12=1 (V), dV13=2 (V), and dV23=3 (V). Here, for example, when dV0=1 (V), each of dV13 and dV23 is not within dV0=1 (V) (FIG. 10 ST32: NO). Thus, the processor 124 selects the electricity storage devices 32 and 33 between which the voltage difference is largest as the target to be subjected to the voltage difference control by charging (FIG. 10 ST34).

Next, the processor 124 switches the circuit breakers S1 and S2 from off to on by the control signals Sig1 and Sig2 except for the circuit breaker S3 included in the control circuit 123 corresponding to the electricity storage device 33 having a smaller voltage of the electricity storage devices 32 and 33 thus selected. Here, the circuit breaker S3 remains off. Thus, a current flows to the electricity storage device 33, and as shown in FIGS. 11 and 12, the electricity storage device 33 is charged, and the voltage V3 increases (FIG. 10 ST35).

Figure 10:
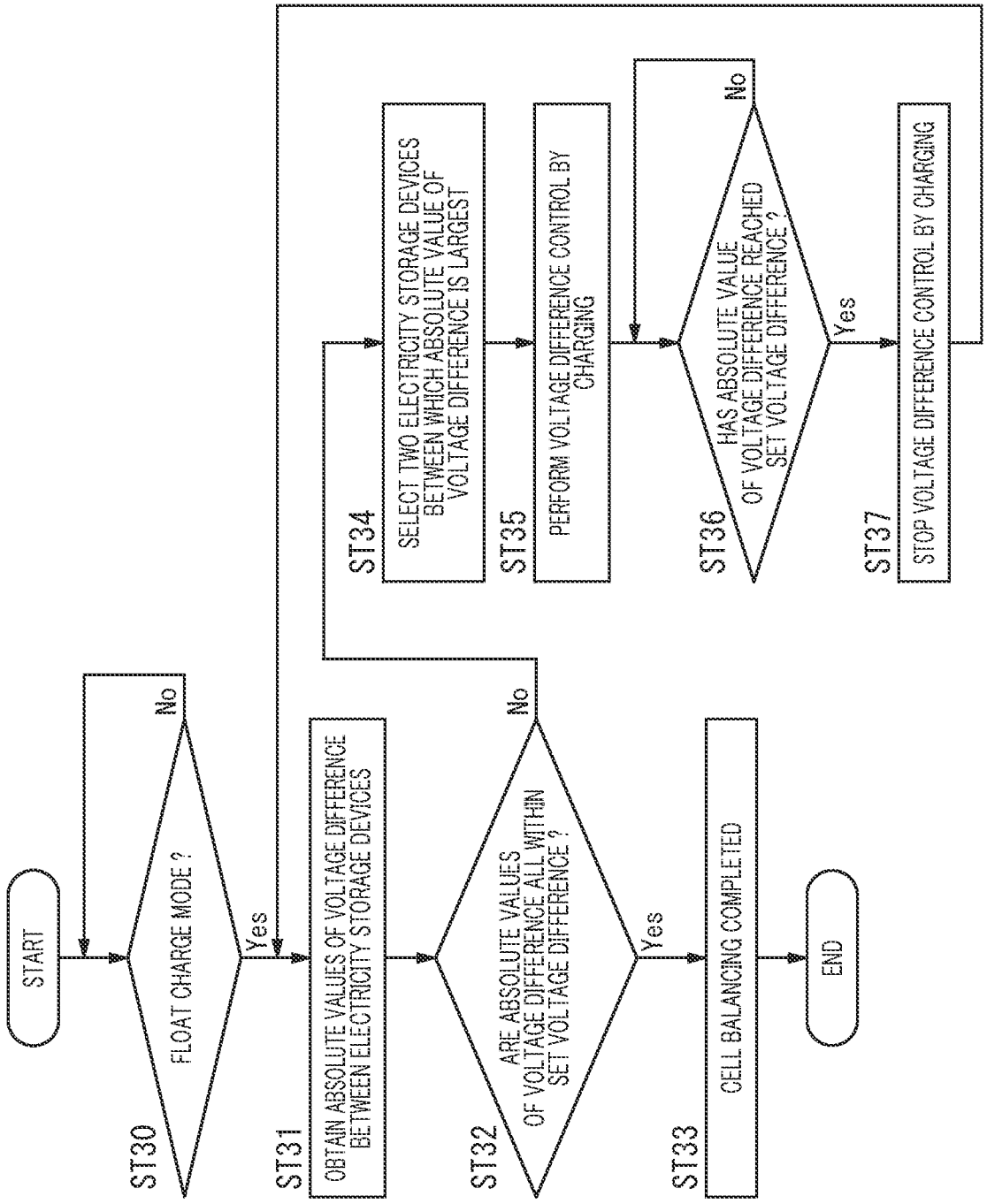
FIG. 10 is a flowchart illustrating cell balancing operation of the electricity storage device control circuit of the first variation in the charge mode.
Figure 11:
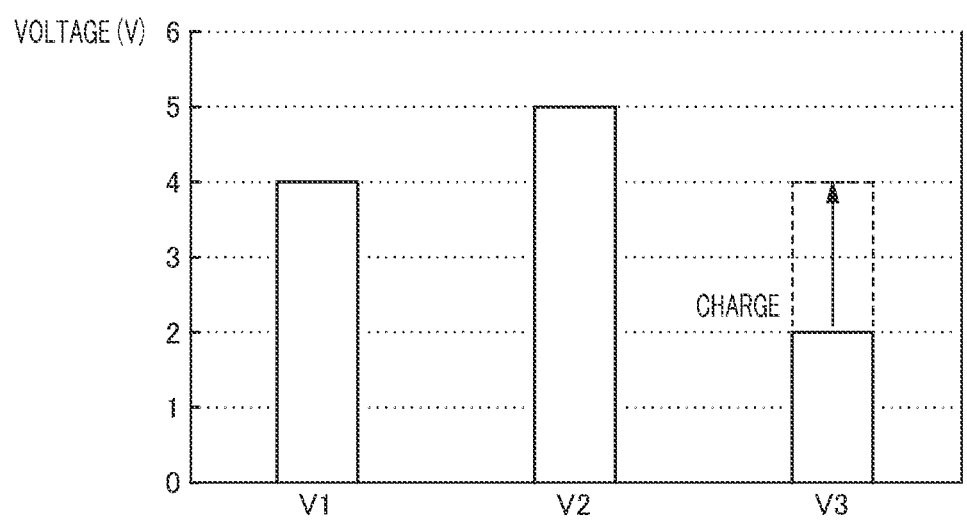
FIG. 11 is a graph illustrating cell balancing operation of the electricity storage device control circuit of the first variation in the charge mode.

Here, when the voltage V3 increases to V3=4 (V), dV23=1 (V) holds true, and dV23 is thus within dV0=1 (FIG. 10 ST36: YES), the processor 124 switches off the circuit breakers S1 and S2 to stop controlling the electricity storage device 33. That is, the voltage difference control by charging the electricity storage devices 32 to 33 is stopped (FIG. 10 ST37).

The processor 124 then calculates dV12, dV13, and dV23 (FIG. 10 ST31).

Figure 12:
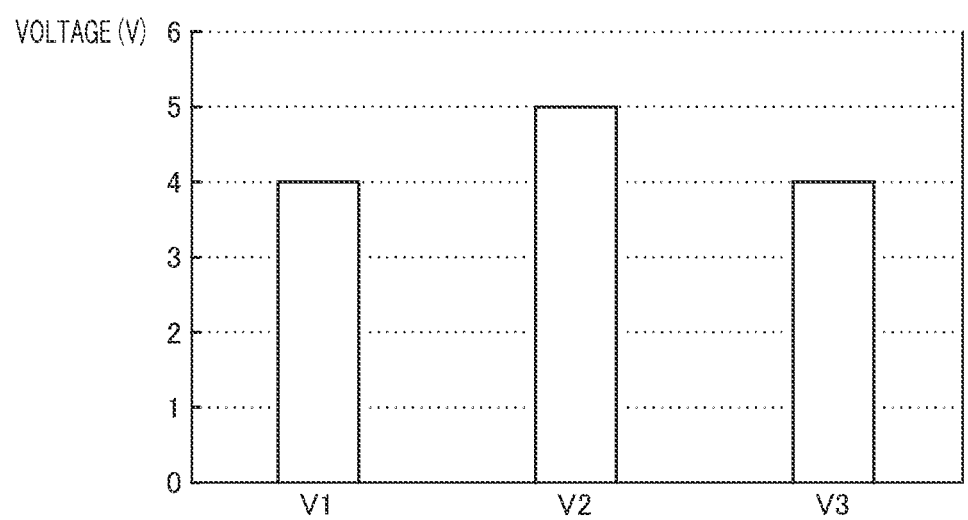
FIG. 12 is a graph illustrating cell balancing operation of the electricity storage device control circuit of the first variation in the charge mode.

Here, as shown in FIG. 12, V1=4 (V), V2=5 (V), and V3=4 (V), and thus, dV12=1(V), dV13=0 (V), and dV23=1 (V). Thus, all of dV12, dV13, and dV23 are within dV0=1 (V) (FIG. 10 ST32: YES). In this case, the processor 124 stops controlling the electricity storage devices 31 to 33, and the cell balancing is completed (FIG. 10 ST33).

(4.2) Second Variation

In a second variation, the voltage controller 12 uses one of the electricity storage devices 31 to 33 as a reference electricity storage device 30. The voltage controller 12 is different from that in the embodiment and the first variation described above in that when the absolute value of a voltage difference between the reference electricity storage device 30 and each of control target electricity storage devices 34 being the electricity storage devices 31 to 33 except for the reference electricity storage device 30 is within the set voltage difference, the voltage controller 12 stops controlling the voltages of the control target electricity storage devices 34. The cell balancing operation of the voltage controller 12 in the discharge mode M1 and the charge mode M2 of the second variation will be described below with reference to FIGS. 1, 4, 13, and 14.

(4.2.1) Cell Balancing Operation in Discharge Mode of Second Variation

Figure 13:
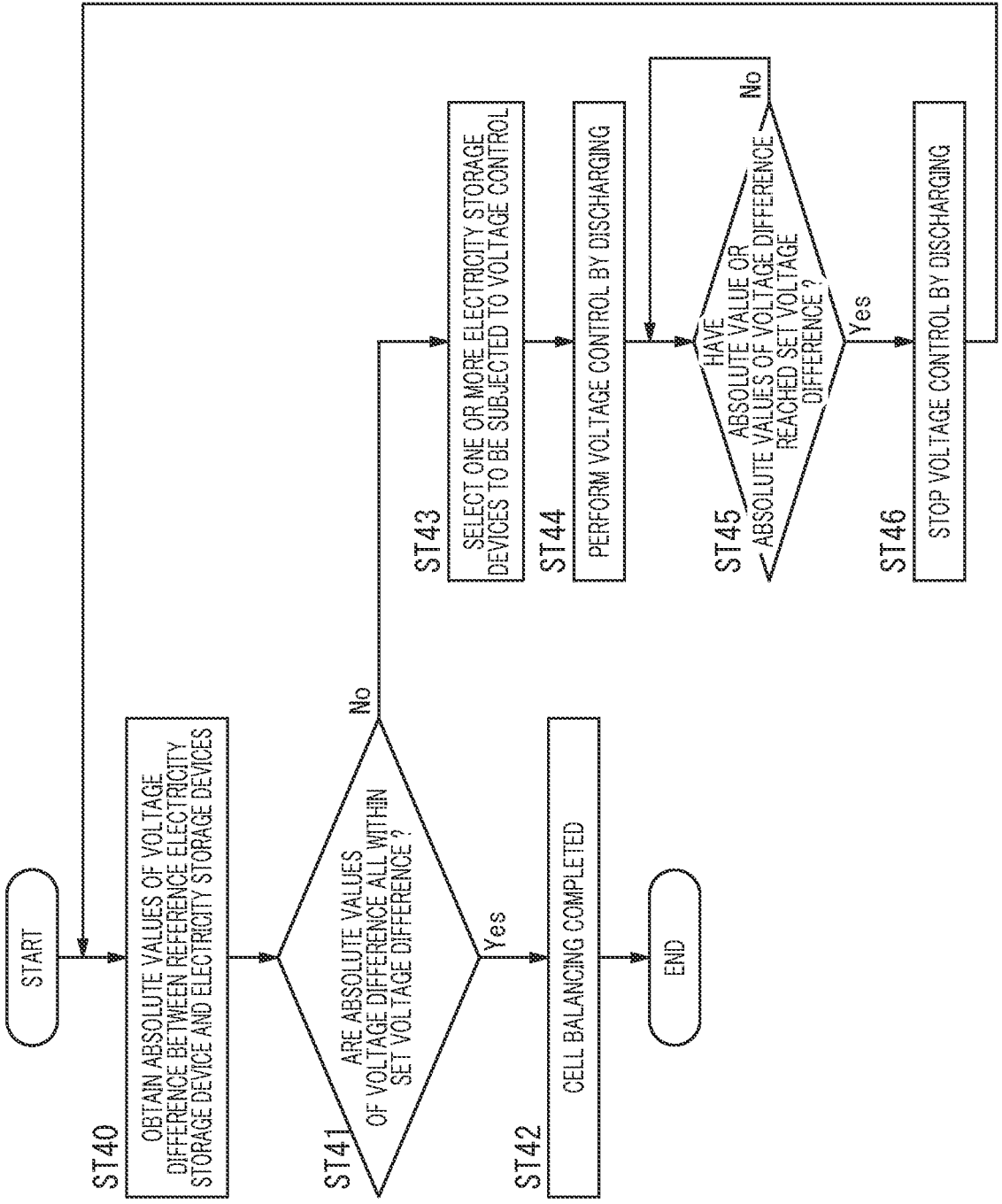
FIG. 13 is a flowchart illustrating cell balancing operation of an electricity storage device control circuit of a second variation in the discharge mode.

In the second variation, the processor 124 included in the voltage controller 12 first receives, at a predetermined period, the signals SigV1 to SigV3 representing the voltages V1 to V3 respectively of the electricity storage devices 31 to 33 from the voltage sensors 111 to 113 of the voltage detector 11 in the discharge mode M1 as shown in FIG. 1. When the processor 124 receives the signals SigV1 to SigV3, the processor 124 obtains the absolute values of the voltage difference of the voltages V1 to V3 from the voltage Vs of the reference electricity storage device 30, that is, dV1=|V1−Vs|, dV2=|V2−Vs|, and dV3=|V3−Vs| (FIG. 13 ST40). Here, in the discharge mode M1 in the second variation, the reference electricity storage device 30 is, for example, an electricity storage device 3 having the lowest voltage of the electricity storage devices 31 to 33.

Here, when all of the absolute values dV1 to dV3 are not within the set voltage difference dV0 stored in the storage 125, the processor 124 controls the voltages V1 to V3 such that all of dV1 to dV3 are within the set voltage difference dV0 by discharging. For example, when V1=4 (V), V2=5 (V), and V3=2 (V), the reference electricity storage device 30 is the electricity storage device 33, and Vs=V3=2 (V). Moreover, dV1=2 (V), dV2=3 (V), and dV3=0 (V). Here, for example, when dV0=1 (V), each of dV1 and dV2 is not within dV0=1 (V) (FIG. 13 ST41: NO). Thus, the processor 124 selects the electricity storage devices 31 and 32 as the control target electricity storage devices 34 to be subjected to voltage control by discharging (FIG. 13 ST43).

The processor 124 then controls the voltages V1 and V2 of the electricity storage devices 31 and 32 such that dV1 and dV2 are within dV0=1 (V). The processor 124 switches the circuit breakers S1 and S2 included in the control circuits 121 and 122 corresponding to the electricity storage devices 31 and 32 from off to on by the control signals Sig1 and Sig2. Thus, electrostatic energy stored in the electricity storage devices 31 and 32 is consumed by the resistors R1 and R2 respectively included in the control circuits 121 and 122, and thereby, the voltages V1 and V2 of the electricity storage devices 31 and 32 decreases (FIG. 13 ST44).

Here, when the voltages V1 and V2 decrease to V1=V2=3 (V), dV1=dV2=1 (V) holds true, and dV1 and dV2 are thus within dV0=1 (V) (FIG. 13 ST45: YES), the processor 124 individually switches off the circuit breakers S1 and S2 to stop controlling the electricity storage devices 31 and 32 (FIG. 13 ST46).

Next, the processor 124 obtains dV1 to dV3 (FIG. 12 ST40). Here, V1=3 (V), V2=3 (V), and V3=2 (V), and thus, dV1=1 (V), dV2=1 (V), and dV3=0 (V). Thus, all of dV1 to dV3 are within dV0=1 (V) (FIG. 13 ST41: YES). In this case, the processor 124 stops controlling the electricity storage devices 31 to 33, and the cell balancing is completed (FIG. 13 ST42).

(4.2.2) Cell Balancing Operation in Charge Mode of Second Variation

Figure 14:
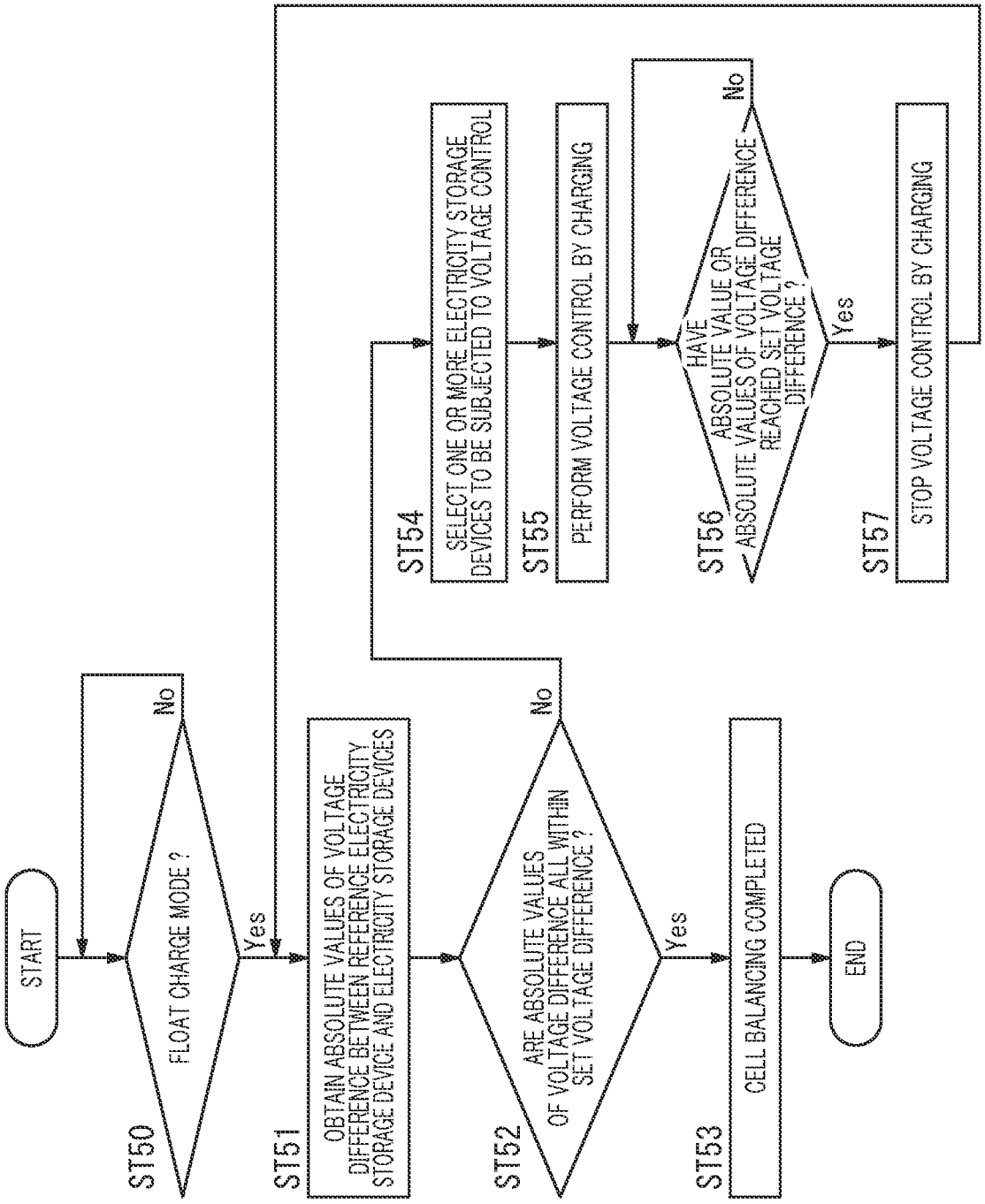
FIG. 14 is a flowchart illustrating cell balancing operation of the electricity storage device control circuit of the second variation in the charge mode.

In the second variation, the processor 124 included in the voltage controller 12 first receives, at a predetermined period, the signals SigV1 to SigV3 representing the voltages V1 to V3 respectively of the electricity storage devices 31 to 33 from the voltage sensors 111 to 113 of the voltage detector 11 in the charge mode M2. In the electricity storage devices 31 to 33 being in the float charge mode immediately before charge completion (FIG. 14 ST50), when the processor 124 receives the signals SigV1 to SigV3, the processor 124 obtains the absolute values of the voltage difference of the voltages V1 to V3 from the voltage Vs of the reference electricity storage device 30, that is, dV1=|V1−Vs|, dV2=|V2−Vs|, and dV3=|V3−Vs| (FIG. 14 ST51). Here, in the charge mode M2 in the second variation, the reference electricity storage device 30 is, for example, an electricity storage device 3 having the highest voltage of the electricity storage devices 31 to 33.

Here, when all of the absolute values dV1 to dV3 are not within the set voltage difference dV0 stored in the storage 125, the processor 124 controls the voltages V1 to V3 such that all of dV1 to dV3 are within the set voltage difference dV0 by charging. For example, when V1=4 (V), V2=5 (V), and V3=2 (V), the reference electricity storage device 30 is the electricity storage device 32, and Vs=V2=5 (V). Moreover, dV1=1 (V), dV2=0 (V), and dV3=3 (V). Here, for example, when dV0=1 (V), dV3 is not within dV0=1 (V) (FIG. 14 ST52: NO). Thus, the processor 124 selects the electricity storage device 33 as the control target electricity storage device 34 to be subjected to voltage control by charging (FIG. 14 ST54).

The processor 124 then controls the voltage V3 of the electricity storage device 33 such that dV3 is within dV0=1 (V). The processor 124 switches the circuit breakers S1 to S2 from off to on by the control signals Sig1 and Sig2 except for the circuit breaker S3 included in the control circuit 123 corresponding to the electricity storage device 33. Here, the circuit breaker S3 remains off. Thus, a current flows to the electricity storage device 33, the electricity storage device 33 is charged, and the voltage V3 increases (FIG. 14 ST55).

Here, when the voltage V3 increases to V3=4 (V), dV3=1 (V) holds true, and dV3 is thus within dV0=1 (V) (FIG. 14 ST56: YES), the processor 124 switches off the circuit breakers S1 and S2 to stop controlling the electricity storage device 33 (FIG. 14 ST57).

Next, the processor 124 obtains dV1 to dV3 (FIG. 14 ST51). Here, V1=4 (V), V2=5 (V), and V3=4 (V), and thus, dV1=1 (V), dV2=0 (V), and dV3=1 (V). Thus, all of dV1 to dV3 are within dV0=1 (V) (FIG. 14 ST52: YES). In this case, the processor 124 stops controlling the electricity storage devices 31 to 33, and the cell balancing is completed (FIG. 14 ST53).

(4.3) Other Variations

Other variations of the embodiment will be described below. The variations described below may be accordingly combined with each other.

The electricity storage device control circuit 1 in the present disclosure includes a computer system. The computer system includes a processor and memory as principal hardware components. The functions of the electricity storage device control circuit 1 according to the present disclosure may be implemented by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit. Thus, the microcontroller may also be implemented as a single or a plurality of electronic circuits including a semiconductor integrated circuit or a large-scale integrated circuit.

Also, the plurality of functions of the electricity storage device control circuit 1 are aggregated together in a single housing. However, this is not an essential configuration for the electricity storage device control circuit 1. Alternatively, these constituent elements of the electricity storage device control circuit 1 may be distributed in multiple different housings. Still alternatively, at least some functions of the electricity storage device control circuit 1 (e.g., some functions of the processor 124) may be implemented as a cloud computing system as well.

(5) Summary

As described above, an electricity storage device control circuit (1) of a first aspect includes a voltage detector (11) and a voltage controller (12). The voltage detector (11) is configured to detect voltages of a plurality of electricity storage devices (3). The voltage controller (12) is configured to individually control the voltages of the plurality of electricity storage devices (3) by performing, based on a detection result by the voltage detector (11), at least one of discharging electrostatic energy stored in the plurality of electricity storage devices (3) or charging electrostatic energy into the plurality of electricity storage devices (3).

This aspect enables the voltages of the plurality of electricity storage devices (3) to be changed to respective desired values.

In an electricity storage device control circuit (1) of a second aspect referring to the first aspect, the voltage controller (12) is configured to perform at least one of the discharging or the charging of the electrostatic energy such that the voltages of the plurality of electricity storage devices (3) are equalized.

This aspect enables a voltage variation between the plurality of electricity storage devices (3) to be reduced.

In an electricity storage device control circuit (1) of a third aspect referring to the first or second aspect, the voltage controller (12) is configured to, when the voltages of the plurality of electricity storage devices (3) reach respective set voltages, stop controlling the voltages of the plurality of electricity storage devices (3).

This aspect enables the voltages of the plurality of electricity storage devices (3) to be maintained at the set voltages.

In an electricity storage device control circuit (1) of a fourth aspect referring to the first or second aspect, the voltage controller (12) is configured to, when an absolute value of a voltage difference between the plurality of electricity storage devices (3) is within a set voltage difference, stop controlling the voltages of the plurality of electricity storage devices (3).

This aspect enables the voltage difference between the plurality of electricity storage devices (3) to be maintained at the set voltage difference.

In an electricity storage device control circuit (1) of a fifth aspect referring to the first or second aspect, the voltage controller (12) is configured to use one of the plurality of electricity storage devices (3) as a reference electricity storage device (30), and the voltage controller (12) is configured to, when an absolute value of a voltage difference between the reference electricity storage device (30) and each of one or more control target electricity storage devices (34) being the plurality of electricity storage devices (3) except for the reference electricity storage device (30) is within a set voltage difference, stop controlling a voltage or voltages respectively of the one or more control target electricity storage devices (34).

This aspect enables the voltage difference between the reference electricity storage device (30) and each of the one or more control target electricity storage devices (34) to be maintained at the set voltage difference.

In an electricity storage device control circuit (1) of a sixth aspect referring to any one of the first to fifth aspects, the voltage controller (12) includes a plurality of control circuits each connected in parallel to a corresponding one of the plurality of electricity storage devices (3). Each of the plurality of control circuits includes a resistor and a circuit breaker which are connected in series to each other. The voltage controller (12) is configured to, in a discharge mode (M1) in which the plurality of electricity storage devices (3) are not connected to the primary power supply (5), switch the circuit breaker on and off to control an amount of the electrostatic energy discharged from the plurality of electricity storage devices (3).

In this aspect, discharging the plurality of electricity storage devices (3) enables the voltage variation between the plurality of electricity storage devices (3) to be reduced.

In an electricity storage device control circuit (1) of a seventh aspect referring to the sixth aspect, the voltage controller (12) is configured to, in a charge mode (M2) in which the plurality of electricity storage devices (3) are connected to the primary power supply (5), control an amount of the electrostatic energy to be charged into the plurality of electricity storage devices (3) by switching the circuit breaker on and off.

With this aspect, charging the plurality of electricity storage devices (3) enables the voltage variation between the plurality of electricity storage devices (3) to be reduced.

A backup power supply system (2) of an eighth aspect includes the electricity storage device control circuit (1) of any one of the first to seventh aspects and the plurality of electricity storage devices (3). In the backup power supply system (2), the plurality of electricity storage devices (3) is configured to be charged by a primary power supply (5) configured to supply electric power to a load (4), and the backup power supply system (2) is configured to supply electric power to the load (4) from the plurality of electricity storage devices when the primary power supply (5) fails.

This aspect provides the backup power supply system (2) having a reduced voltage variation between the plurality of electricity storage devices (3).

In a backup power supply system (2) of a ninth aspect referring to the eighth aspect, the plurality of electricity storage devices (3) include an electric double-layer capacitor.

This aspect provides the backup power supply system (2) configured to supply required electric power to the load (4) when the primary power supply (5) fails.

Note that the second to seventh aspects are not essential configurations of the electricity storage device control circuit (1) and may accordingly be omitted. Moreover, the ninth aspect is not an essential configuration of the backup power supply system (2) and may accordingly be omitted.

REFERENCE SIGNS LIST

1 Electricity Storage Device Control Circuit
11 Voltage Detector
12 Voltage Controller
2 Backup Power Supply System
3 Electricity Storage Device
30 Reference Electricity Storage Device
34 Control Target Electricity Storage Device
4 Load
5 Primary Power Supply
M1 Discharge Mode
M2 Charge Mode

The invention claimed is:

1. An electricity storage device control circuit comprising:
a voltage detector configured to detect voltages of a plurality of electricity storage devices;
a voltage controller configured to perform a cell balance operation by controlling the voltages of the plurality of electricity storage devices based on a detection result by the voltage detector; and
a plurality of control circuits, each of which is connected in parallel to a corresponding one of the plurality of electricity storage devices, wherein:
each of the plurality of control circuits includes a resistor and a circuit breaker which are connected in series to each other, and
in a charge mode, in which the plurality of electricity storage devices are connected to a primary power supply different from the plurality of electricity storage devices and receive electric power from the primary power supply, the cell balance operation includes controlling the circuit breaker of each of the plurality of control circuits to charge an electricity storage device exhibiting a lowest voltage among the plurality of electricity storage devices by a current flowing through the resistance of each of one or more of the plurality of control circuits other than a control circuit provided to the electricity storage device exhibiting the lowest voltage, while maintaining voltages of one or more remaining electricity storage devices other than the electricity storage device exhibiting the lowest voltage.

2. The electricity storage device control circuit of claim 1, wherein
the voltage controller is configured to perform the cell balance operation such that the voltages of the plurality of electricity storage devices are equalized.

3. The electricity storage device control circuit of claim 1, wherein
the voltage controller is configured to, when the voltages of the plurality of electricity storage devices reach respective set voltages, stop the cell balance operation.

4. The electricity storage device control circuit of claim 1, wherein
the voltage controller is configured to, when an absolute value of a voltage difference between the plurality of electricity storage devices is within a set voltage difference, stop the cell balance operation.

5. The electricity storage device control circuit of claim 1, wherein:
the voltage controller is configured to use one of the plurality of electricity storage devices as a reference electricity storage device, and the voltage controller is configured to, when an absolute value of a voltage difference between the reference electricity storage device and each of one or more control target electricity storage devices among the plurality of electricity storage devices except for the reference electricity storage device is within a set voltage difference, stop the cell balance operation.

6. The electricity storage device control circuit of claim 1, wherein:
in a discharge mode in which the plurality of electricity storage devices are not connected to the primary power supply different from the plurality of electricity storage devices, the cell balance operation includes controlling the circuit breaker of each of the plurality of control circuits to discharge one or more electricity storage devices exhibiting a higher voltage than a threshold voltage among the plurality of electricity storage devices, while maintaining voltages of one or more remaining electricity storage devices other than the one or more electricity storage devices exhibiting the higher voltage than the threshold voltage.

7. A backup power supply system comprising:
an electricity storage device control circuit; and
a plurality of electricity storage devices, wherein:
the plurality of electricity storage devices are configured to be charged by a primary power supply, different from the plurality of electricity storage devices, configured to supply electric power to a load,
the backup power supply system is configured to supply electric power to the load from the plurality of electricity storage devices when the primary power supply fails, and
the electricity storage device control circuit comprises:
a voltage detector configured to detect voltages of the plurality of electricity storage devices;
a voltage controller configured to perform a cell balance operation by controlling the voltages of the plurality of electricity storage devices based on a detection result by the voltage detector; and
a plurality of control circuits, each of which is connected in parallel to a corresponding one of the plurality of electricity storage devices, wherein:
each of the plurality of control circuits includes a resistor and a circuit breaker which are connected in series to each other, and
in a charge mode, in which the plurality of electricity storage devices are connected to the primary power supply and receive electric power from the primary power supply, the cell balance operation includes controlling the circuit breaker of each of the plurality of control circuits to charge an electricity storage device exhibiting a lowest voltage among the plurality of electricity storage devices by a current flowing through the resistance of each of one or more of the plurality of control circuits other than a control circuit provided to the electricity storage device exhibiting the lowest voltage, while maintaining voltages of one or more remaining electricity storage devices other than the electricity storage device exhibiting the lowest voltage.

8. The backup power supply system of claim 7, wherein each of the plurality of electricity storage devices includes an electric double-layer capacitor.

9. The backup power supply system of claim 7 wherein the voltage controller is configured to, when the voltages of the plurality of electricity storage devices reach respective set voltages, stop performing the cell balance operation.

10. The backup power supply system of claim 7, wherein the voltage controller is configured to, when an absolute value of a voltage difference between the plurality of electricity storage devices is within a set voltage difference, stop performing the cell balance operation.

11. The backup power supply system of claim 7, wherein:
the voltage controller is configured to use one of the plurality of electricity storage devices as a reference electricity storage device, and
the voltage controller is configured to, when an absolute value of a voltage difference between the reference electricity storage device and each of one or more control target electricity storage devices among the plurality of electricity storage devices except for the reference electricity storage device is within a set voltage difference, stop performing the cell balance operation.

12. The backup power supply system of claim 7, wherein:
in a discharge mode in which the plurality of electricity storage devices are not connected to the primary power supply, the cell balance operation includes controlling the circuit breaker of each of the plurality of control circuits to discharge one or more electricity storage devices exhibiting a higher voltage than a threshold voltage among the plurality of electricity storage devices, while maintaining voltages of one or more remaining electricity storage devices other than the one or more electricity storage devices exhibiting the higher voltage than the threshold voltage.

13. The electricity storage device control circuit of claim 3, wherein:
the voltage controller includes a plurality of control circuits each connected in parallel to a corresponding one of the plurality of electricity storage devices,
each of the plurality of control circuits includes a resistor and a circuit breaker which are connected in series to each other, and
the voltage controller is configured to, in a discharge mode in which the plurality of electricity storage devices are not connected to a primary power supply different from the plurality of electricity storage devices, switch the circuit breaker on and off to control an amount of the electrostatic energy discharged from the plurality of electricity storage devices.

14. The electricity storage device control circuit of claim 4, wherein:
the voltage controller includes a plurality of control circuits each connected in parallel to a corresponding one of the plurality of electricity storage devices,
each of the plurality of control circuits includes a resistor and a circuit breaker which are connected in series to each other, and
the voltage controller is configured to, in a discharge mode in which the plurality of electricity storage devices are not connected to a primary power supply different from the plurality of electricity storage devices, switch the circuit breaker on and off to control an amount of the electrostatic energy discharged from the plurality of electricity storage devices.

15. The electricity storage device control circuit of claim 5, wherein:
the voltage controller includes a plurality of control circuits each connected in parallel to a corresponding one of the plurality of electricity storage devices,
each of the plurality of control circuits includes a resistor and a circuit breaker which are connected in series to each other, and the voltage controller is configured to, in a discharge mode in which the plurality of electricity storage devices are not connected to a primary power supply different from the plurality of electricity storage devices, switch the circuit breaker on and off to control an amount of the electrostatic energy discharged from the plurality of electricity storage devices.

16. The electricity storage device control circuit of claim 2, wherein:
the voltage controller includes a plurality of control circuits each connected in parallel to a corresponding one of the plurality of electricity storage devices,
each of the plurality of control circuits includes a resistor and a circuit breaker which are connected in series to each other, and
the voltage controller is configured to, in a charge mode in which the plurality of electricity storage devices are connected to a primary power supply different from the plurality of electricity storage devices, control an amount of the electrostatic energy discharged from the at least one of the plurality of electricity storage devices to be charged into the another of the plurality of electricity storage devices by switching the circuit breaker on and off.

17. The electricity storage device control circuit of claim 3, wherein:
the voltage controller includes a plurality of control circuits each connected in parallel to a corresponding one of the plurality of electricity storage devices,
each of the plurality of control circuits includes a resistor and a circuit breaker which are connected in series to each other, and
the voltage controller is configured to, in a charge mode in which the plurality of electricity storage devices are connected to a primary power supply different from the plurality of electricity storage devices, control an amount of the electrostatic energy discharged from the at least one of the plurality of electricity storage devices to be charged into the another of the plurality of electricity storage devices by switching the circuit breaker on and off.

18. The electricity storage device control circuit of claim 1, wherein, in the charge mode, the cell balance operation is performed after float charging is detected.

19. The backup power supply system of claim 7, wherein, in the charge mode, the cell balance operation is performed after float charging is detected.

* * * * *